United States Patent Office 3,611,503
Patented Oct. 12, 1971

3,611,503
INJECTION MOLDING APPARATUS FOR
PLASTIC MATERIALS
Armin Blumer, Schwanden, Switzerland, assignor to
Maschinenfabrik und Giesserei Netstal AG, Netstal,
Switzerland
Filed Apr. 15, 1969, Ser. No. 816,212
Claims priority, application Switzerland, Apr. 18, 1968,
5,941/68
Int. Cl. B29f 1/04
U.S. Cl. 18—30 AM
4 Claims

ABSTRACT OF THE DISCLOSURE

Injection molding apparatus for plastic materials includes a plastifying screw rotatable in a plastifying cylinger communicating with an injection cylinder having an injection piston reciprocable therein, and a channel interconnecting the two cylinders. The channel has a valve seat facing the plastifying cylinder, and the screw has a forward end constructed as a valve member engageable with the valve seat. Piston means are operable, immediately prior to the injection period, to displace the screw axially to engage the valve member sealingly with the valve seat to interrupt communication between the two cylinders during the injection period.

BACKGROUND OF THE INVENTION

Figure 1:
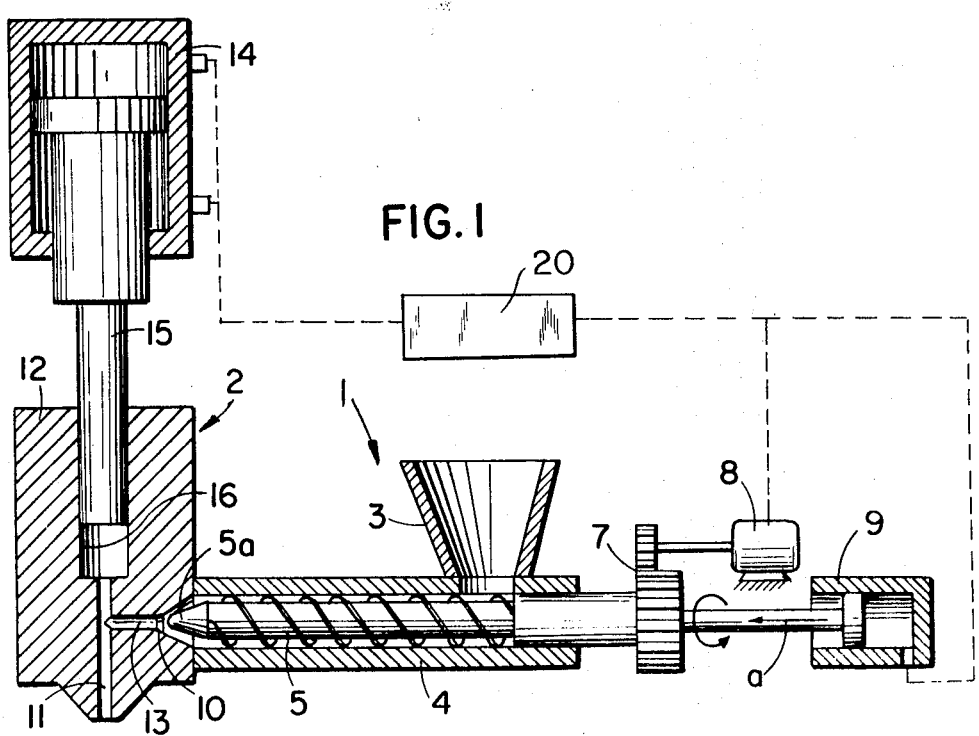

A known apparatus for injection molding plastic materials includes a plastifying device using a screw, and further includes piston injection means. In known machines of this type, a separate valve is provided between the plastifying device and the injection device. During the injection process or period, this valve closes the plastifying device with respect to the injection device, so that there is no feedback of the injection material into the plastifying devices. In many cases, this valve is a simple back pressure valve including a spherical or conical valve member, although the valve may be constructed as an adjustable slide valve.

Known embodiments of such a valve used in injection molding apparatus have the disadvantage that they can be the starting point for destructive phenomena in the molding material flowing through the valve, more particularly, with thermally sensitive plastics. On the other hand, with high pressures of 2500 kg./cm.$^2$ and greater in the injection material, the contact pressures of the valve member on the seat become so high that they no longer can be accommodated by the steels normally used to form the valve members and the valve seats.

SUMMARY OF THE INVENTION

This invention relates to injection molding apparatus for molding plastic materials and, more particularly, to an improved, simplified and more efficient valve arrangement for blocking communication between a plastifying cylinder and an injection cylinder during the injection period.

The objective of the present invention is to avoid or at least minimize disadvantages of known valve constructions for this purpose. To this end, the plastifying screw has a nose or forward end constructed as a valve member and, during the functioning of control means during the injection period, this valve member is applied against a valve seat in a channel interconnecting the plastifying and injection devices. The valve member thus blocks communication between the plastifying and injection cylinders.

An object of the invention is to provide an improved injection molding apparatus for molding plastic material and including an improved valve for interrupting communication between plastifying and injection devices during the injection period.

Another object of the invention is to provide such injection molding apparatus in which the valve is simplified and is more efficient in operation.

A further object of the invention is to provide such an injection molding apparatus in which a valve seat is formed at the entrance to a channel connecting a plastifying cylinder to an injection cylinder, and a rotatable plastifying screw in a plastifying cylinder has a forward end or nose constructed as a valve member engageable with the valve seat.

Another object of the invention is to provide such injection molding apparatus including means operable, during the injection period, to engage the valve member sealingly with the valve seat to block communication between the plastifying and injection cylinders.

A further object of the invention is to provide such an injection molding apparatus in which, responsive to feeding of material to the plastifying cylinder, the rotatable screw is automatically retracted to disengage the valve member from the valve seat.

For an understanding of the principles of the invention, reference is made to the following description of a typical embodiment thereof as illustrated in the accompanying drawings.

Figure 2:
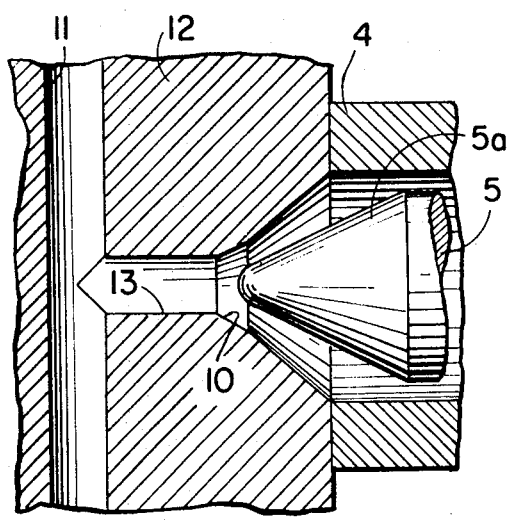
Figure 3:
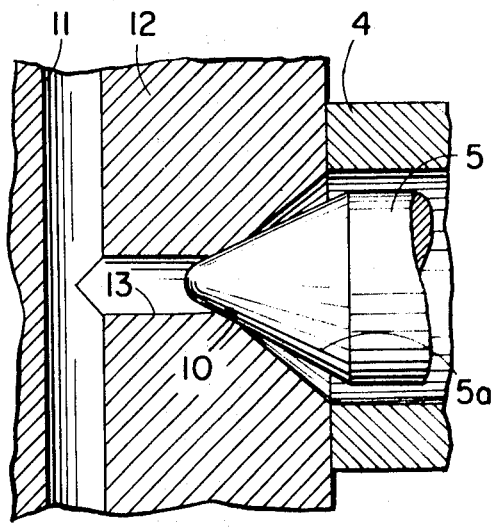

In the drawings:

FIG. 1 is an axial sectional view through a screw plastifying device and a piston injection device of molding apparatus embodying the invention; and, FIGS. 2 and 3 are partial axial sectional views, to a larger scale, illustrating the valve parts between the plastifying device and the piston injection device, with FIG. 2 illustrating the valve parts in the open position and FIG. 3 illustrating the valve parts in the closed position.

Referring to FIGS. 1, 2 and 3, the injection molding apparatus includes a screw plastifying device 1 and a piston-type injection molding device 2. The screw plastifying device includes a plastifying screw 5, with a rounded conical nose 5a, rotatably and axially displaceably arranged in a heated plastifying cylinder 4 provided with a feed hopper 3. Screw 5 is rotated by a motor 8 adjacent the rear end thereof, motor 8 rotating screw 5 through gearing 7. Screw 5 is axially displaceable in the direction of arrow $a$ by a piston device 9.

The rounded conical nose 5a of screw 5 comprises a valve member which is arranged to cooperate with a conical valve seat 10 formed on a funnel-shaped inlet of a supply channel 13 connecting plastifying cylinder 4 to an injection passage 11 in an injection head 12 of injection molding device 2. An injection piston 15 is actuatable by a hydraulic piston device 14, which also serves to feed a measured amount of injection material. Piston 15 is driven into a cylinder 16 of injection head 12, cylinder 16 forming a coaxial extension of injection passage 11. Injection passage 11 and cylinder 16 are oriented at right angles to the axis of screw 5.

The injection molding apparatus operates in a manner which will now be described. During plastification of the injection material introduced through hopper 3 into heated plastifying cylinder 4, screw 5 is rotated by motor 8 through the medium of gearing 7. The discharge pressure thereby produced in cylinder 4 causes screw 5 to move axially rearwardly in a direction opposite to that of arrow $a$, in FIG. 1, until the screw reaches its rearmost position. In this position, the conical nose 5a of the screw 5, as shown more particularly in FIG. 2, is displaced from valve seat 10. Consequently, the plastified injection material is transferred from cylinder 4 through supply channel 13 and one branch of injection channel 11 into the cavity of cylinder 16, whose volume is increasing by virtue of the simultaneous retraction of piston 15.

When the desired amount of injection material, predetermined by correspondingly adjusting the return motion of piston device 14, is in cylinder 16, injection can be effected. At this time, however, further feeding of injection material by plastifying screw 5 must cease, and also the connection between injection channel 11 and the plastifying cylinder 4 must be interrupted so as to prevent, or substantially prevent, a back flow of injection material into plastifying cylinder 4.

For this purpose, immediately before the initiation of the injection movements of piston 15, screw 5 is moved, by hydraulic piston device 9, in the direction of arrow *a*, until conical nose 5*a* is as shown in FIG. 3, pressed firmly and sealingly against valve seat 10. After the injection is finished, piston device 9 is unloaded so that the counter pressure, produced at the end of the plastifying process effected by the rotating screw 5, automatically moves screw 5 rearwardly in the direction opposite to that of arrow *a*. By the resultant retraction of nose 5*a* from valve seat 10, supply channel 13 is re-opened to reestablish communication between plastifying cylinder 4 and injection channel 11. The operation of piston device 14, motor 8 and hydraulic piston device 9 is effected by suitable control means 20, such control means being known and conventional in the art, as mentioned in Hendry, U.S. Pat. No. 2,890,491, issued June 16, 1959, particularly column 7, lines 19, 20 and 21.

The injection molding apparatus thus described is not only simple but avoids the necessity of providing separately operated valves in the supply channel.

What is claimed is:

1. In injection molding apparatus for molding plasticizible material and including a plastifying screw rotatable in a plastifying cylinder communicating with an injection cylinder having an injection piston reciprocable therein, and a channel interconnecting the plastifying and injection cylinders, the improvement comprising, in combination, said channel having a valve seat facing said plastifying cylinder; said screw having a forward end constructed as a valve member engageable with said valve seat; means to displace said screw and control means responsive to accumulation of a predetermined charge of material in said injection cylinder, and immediately prior to the injection stroke, to activate said displacing means to displace said screw to engage said valve member sealingly with said valve seat to block communication between said plastifying and injection cylinders during the injection stroke.

2. In injection molding apparatus, the improvement claimed in claim 1, in which said means to displace said screw includes a piston device operating on a rearward extension of said screw and operable to press said valve member against said valve seat; said piston device being loaded automatically, to retract said valve member from said valve seat, by the discharge pressure produced in the screw rotating in said plastifying cylinder.

3. In injection molding apparatus, the improvement claimed in claim 1, in which said valve seat and said valve member have conical shapes.

4. In injection molding apparatus, the improvement claimed in claim 3, in which said valve seat is formed on a funnel-shaped inlet side of said channel interconnecting said plastifying and injection cylinders.

References Cited

UNITED STATES PATENTS

| | | | |
|---|---|---|---|
| 2,890,491 | 6/1959 | Hendry | 18—30 SRM |
| 3,259,944 | 7/1966 | McIlvin | 18—30 AM |

FOREIGN PATENTS

| | | | |
|---|---|---|---|
| 641,952 | 7/1962 | Italy | 18—30 SQ |
| 392,059 | 9/1965 | Switzerland | 18—30 AC |

J. SPENCER OVERHOLSER, Primary Examiner

N. E. LEHRER, Assistant Examiner

U.S. Cl. X.R.

18—30 AC, 30 CR